(12) United States Patent
Iwata et al.

(10) Patent No.: US 10,456,966 B2
(45) Date of Patent: Oct. 29, 2019

(54) HOLLOW-BODY MOLDING DEVICE

(71) Applicant: TOYODA IRON WORKS CO., LTD., Toyota-shi, Aichi (JP)

(72) Inventors: Kunihiro Iwata, Toyota (JP); Hideaki Sakai, Toyota (JP); Yasuhiro Sone, Toyota (JP); Yoshinori Sadakata, Ota (JP); Kazuhiro Yokobori, Ota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 322 days.

(21) Appl. No.: 15/539,547

(22) PCT Filed: Dec. 21, 2015

(86) PCT No.: PCT/JP2015/085728
§ 371 (c)(1),
(2) Date: Jun. 23, 2017

(87) PCT Pub. No.: WO2016/104457
PCT Pub. Date: Jun. 30, 2016

(65) Prior Publication Data
US 2018/0009144 A1    Jan. 11, 2018

(30) Foreign Application Priority Data

Dec. 24, 2014 (JP) .................................. 2014-261392

(51) Int. Cl.
*B29C 45/26* (2006.01)
*B29C 45/17* (2006.01)
(Continued)

(52) U.S. Cl.
CPC ........ *B29C 45/261* (2013.01); *B29C 45/1704* (2013.01); *B29C 45/1711* (2013.01);
(Continued)

(58) Field of Classification Search
CPC .............. B29C 45/261; B29C 45/1704; B29C 2045/0087
See application file for complete search history.

(56) References Cited

U.S. PATENT DOCUMENTS

| 5,948,343 A | 9/1999 | Hiroki et al. |
| 2013/0236591 A1 | 9/2013 | Sakamoto et al. |

FOREIGN PATENT DOCUMENTS

| CN | 103269842 A | 8/2013 |
| JP | H09-193187 A | 7/1997 |

(Continued)

OTHER PUBLICATIONS

Mar. 13, 2019 Office Action issued in Chinese Patent Application No. 201580070726.5.
(Continued)

*Primary Examiner* — James Sanders
(74) *Attorney, Agent, or Firm* — Oliff PLC (57) ABSTRACT

A hollow body molding device forming a hollow molded body in a main cavity of a mold having in its one end a pressure port including a floating core by injecting molten resin through an injection gate into the main cavity having an outlet, and then pressure-injecting pressurized fluid through the pressure port into the main cavity to move the core toward the outlet through the resin injected into the main cavity to extrude the resin through the outlet and discharge it into a waste cavity, the device having: a floating core accommodating portion located between the outlet and a communication passage leading to the waste cavity and adjoins the main cavity and accommodates the core moved to the outlet by the fluid, in the device, a floating core accommodating portion inside diameter is smaller than a main cavity outlet diameter and is larger than a floating core outside diameter.

6 Claims, 7 Drawing Sheets

(51) Int. Cl.
 *B29C 45/00* (2006.01)
 *B29L 23/00* (2006.01)
(52) U.S. Cl.
 CPC .......................... *B29C 2045/0087* (2013.01);
  *B29C 2793/009* (2013.01); *B29C 2793/0027*
    (2013.01); *B29L 2023/00* (2013.01)

(56) References Cited

FOREIGN PATENT DOCUMENTS

| JP | H10-202685 A | 8/1998 |
| JP | 2009-148970 A | 7/2009 |
| JP | 2012-131136 A | 7/2012 |
| JP | 2012-153086 A | 8/2012 |

OTHER PUBLICATIONS

Mar. 29, 2016 Search Report issued in International Patent Application No. PCT/JP2015/085728.
Sep. 5, 2018 Office Action issued in Chinese Patent Application No. 201580070726.5.
Jul. 16, 2018 Search Report issued in European Patent Application No. 15873025.9.
Feb. 26, 2019 European Office Action issued in European Patent Application No. 15873025.9.
Mar. 29, 2016 Written Opinion issued in International Patent Application No. PCT/JP2015/085728.
Dec. 19, 2017 Office Action issued in Japanese Patent Application No. 2014-261392.

HOLLOW-BODY MOLDING DEVICE

TECHNICAL FIELD

The present invention relates to a technique by which, in hollow body molding devices that form a hollow molded body in a main cavity by moving a floating core in molten resin injected into the main cavity and thus extruding the molten resin from the main cavity and discharging the extruded molten resin into a waste cavity, an unnecessary portion integrally connected to the hollow molded body can be more easily separated from the hollow molded body after the molding process of the hollow body molding device as compared to conventional examples.

BACKGROUND ART

Hollow body molding devices are known which form a hollow molded body in a main cavity of a mold having in its one end a pressure port including a floating core by injecting molten resin through an injection gate into the main cavity having an outlet in its other end, and then pressure-injecting pressurized fluid through the pressure port into the main cavity to move the floating core toward the outlet through the molten resin injected into the main cavity so as to extrude the molten resin through the outlet and discharge the extruded molten resin into a waste cavity. Such hollow body molding devices are described in, e.g., Patent Documents 1 and 2.

RELATED ART DOCUMENTS

Patent Documents

Patent Document 1: Japanese Patent Application Publication No. 2012-131136
Patent Document 2: Japanese Patent Application Publication No. 2009-148970

SUMMARY OF THE INVENTION

Problem to be Solved by the Invention

In such hollow body molding devices, the molten resin is extruded from the main cavity into the waste cavity as the floating core is moved in the molten resin injected into the main cavity. Accordingly, molded bodies formed by such hollow body molding devices are single-piece molded bodies formed by a hollow molded body formed in the main cavity and a portion formed in the space extending from the main cavity to the waste cavity, namely a portion that is not necessary for a product. Accordingly, in, e.g., Patent Document 1, the unnecessary portion is separated from the hollow molded body with a saw etc.

However, separating the unnecessary portion from the hollow molded body with, e.g., cutting means such as a saw as in Patent Document 1 has problems such as foreign matter being introduced into the hollow molded body or resin burrs being formed in the hollow molded body.

The present invention was developed in view of the above circumstances, and it is an object of the present invention to provide a hollow body molding device that can more easily separate, after a molding process, an unnecessary portion connected to a hollow molded body as compared to conventional examples.

Solution to Problem

To achieve the above object, the principle of the invention provides a hollow body molding device (a) that forms a hollow molded body in a main cavity of a mold having in its one end a pressure port including a floating core by injecting molten resin through an injection gate into the main cavity having an outlet in its other end, and then pressure-injecting pressurized fluid through the pressure port into the main cavity to move the floating core toward the outlet through the molten resin injected into the main cavity so as to extrude the molten resin through the outlet and discharge the extruded molten resin into a waste cavity, the hollow body molding device characterized by comprising: (b) a floating core accommodating portion that is located between the outlet of the main cavity and a communication passage leading to the waste cavity and adjoins the main cavity and that accommodates the floating core moved to the outlet by the pressurized fluid, wherein (c) an inside diameter of the floating core accommodating portion is smaller than an outlet diameter of the main cavity and is larger than an outside diameter of the floating core.

Advantageous Effects of the Invention

According to the hollow body molding device configured as described above, when the floating core extrudes the molten resin and is accommodated in the floating core accommodating portion, the molten resin in the shape of a thin-walled tube with a wall thickness smaller than the wall thickness of the hollow molded body is formed on the inner wall surface of the floating core accommodating portion by the floating core. The portion having the shape of a thin-walled tube and integrally connecting the hollow molded body formed in the main cavity to the unnecessary portion formed in the communication passage is thus formed in the floating core accommodating portion through the molding process. The unnecessary portion connected to the hollow molded body can therefore be more easily separated from the hollow molded body via the portion having the shape of a thin-walled tube by hand etc. as compared to conventional examples.

Preferably, the hollow body molding device further comprises (a) a core receiving portion having a diameter smaller than the outside diameter of the floating core is located between the communication passage and the floating core accommodating portion in order to receive the floating core moved to the outlet and discharged from the main cavity by the pressurized fluid, wherein (b) when the floating core is received by the core receiving portion, the floating core is completely contained in the floating core accommodating portion, and communication between the floating core accommodating portion and the communication passage is cut off. Since the floating core cuts off communication between the floating core accommodating portion and the communication passage when the floating core is received by the core receiving portion, backflow of the molten resin from the communication passage and the waste cavity into the floating core accommodating portion is prevented, and the wall thickness and quality of the molten resin formed in the shape of a thin-walled tube on the inner wall surface of the floating core accommodating portion are stabilized. Since the core receiving portion has a diameter smaller than the outside diameter of the floating core, the portion with a wall thickness of substantially zero is formed so as to be continuous with the hollow molded body and the intermediate diameter molded body containing the floating core. For example, by separating, after the molding process, the molded body between the intermediate diameter molded body formed in the floating core accommodating portion and the small diameter molded body formed in the communication passage, it can be visually checked if the floating core is exposed from the separated intermediate diameter molded body, and it can thus be checked if the floating core has passed through the main cavity.

Preferably, the hollow body molding device is provided, wherein (a) the injection gate is connected to the communication passage, and (b) the molten resin injected through the injection gate fills the main cavity and the floating core accommodating portion. Since the unnecessary portion formed in the communication passage is separated from the hollow molded body formed in the main cavity after the molding process, no gate mark is left on the hollow molded body by the injection gate, and the hollow molded body thus has improved appearance.

Preferably, the hollow body molding device is provided, wherein (a) the floating core has a columnar or spherical shape, and (b) the floating core accommodating portion has a circular section. Accordingly, the molten resin that is in the shape of a thin-walled tube with a uniform wall thickness and that integrally connects the hollow molded body formed in the main cavity and the unnecessary portion formed in the communication passage is formed in the floating core accommodating portion through the molding process. This can suitably reduce the size of any resin burrs that are formed when the unnecessary portion connected to the hollow molded body is separated from the hollow molded body.

Preferably, the hollow body molding device is provided, wherein (a) a product core is connected to the floating core so as to adjoin the pressure port side of the floating core, and (b) when the floating core is accommodated in the floating core accommodating portion, the product core remains in the other end of the main cavity. Since the product core is contained in the end of the hollow molded body formed in the main cavity, a new shape can be added to one end of the hollow molded body by the product core.

Preferably, the hollow body molding device is provided, wherein (a) the main cavity includes a small diameter portion formed on the outlet side of the main cavity and an increased diameter portion formed on the pressure port side of the small diameter portion and having an inside diameter larger than an inside diameter of the small diameter portion, (b) an increased diameter core having an outside diameter larger than the outside diameter of the floating core is disposed on the pressure port side of the floating core, (c) the increased diameter core has a hole that allows the pressurized fluid pressure-injected through the pressure port into the main cavity to flow into the floating core, and (d) when the floating core and the increased diameter core are moved toward the outlet by the pressurized fluid, the increased diameter core remains in the increased diameter portion of the main cavity. Accordingly, the pressurized fluid flows through the holes in the increased diameter core, and the floating core is accommodated in the floating core accommodating portion by the pressurized fluid. Such a hollow molded body can thus be formed that the inside diameter of the small diameter portion of the hollow molded body formed in the main cavity is smaller than the inside diameter of the increased diameter portion.

Preferably, the hollow body molding device is provided, wherein (a) a product core is disposed between the floating core and the increased diameter core, and (b) when the floating core is accommodated in the floating core accommodating portion, the product core remains in the other end of the main cavity. Such a hollow molded body can thus be formed that the inside diameter of the small diameter portion of the hollow molded body formed in the main cavity is smaller than the inside diameter of the increased diameter portion. Moreover, a new shape can be added to one end of the hollow molded body by the product core.

MODES FOR CARRYING OUT THE INVENTION

Embodiments of the present invention will be described in detail below with reference to the accompanying drawings. The figures in the following embodiments are shown simplified or deformed as appropriate for the purpose of illustration, and each part is not necessarily drawn at an accurate dimensional ratio, in an accurate shape, etc.

First Embodiment

Figure 1:
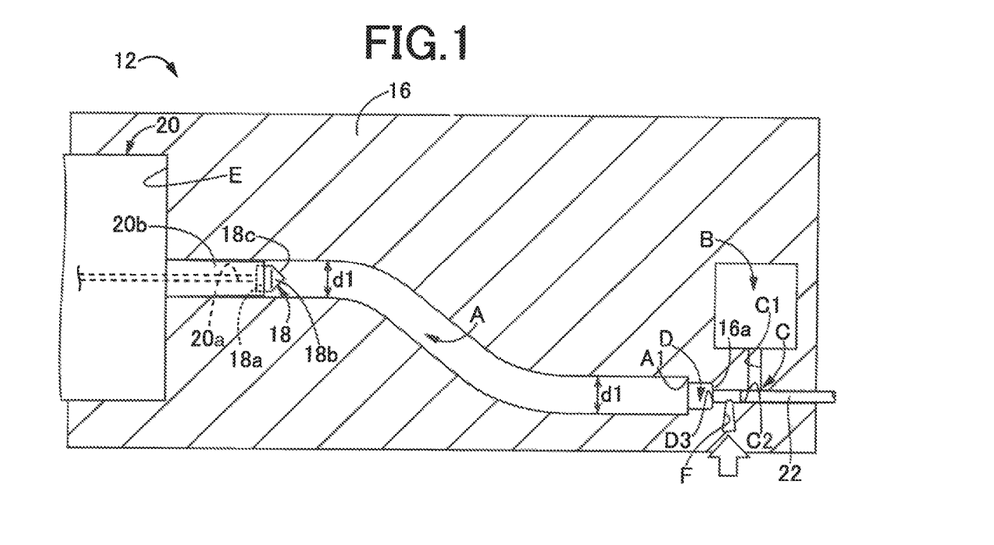
FIG. 1 is a view schematically illustrating the configuration of a hollow body molding device to which the present invention is suitably applied.

FIG. 1 is a view schematically illustrating a hollow body molding device 12, which forms a hollow molded body 10 (see FIG. 5) such as, e.g., cooling system pipes and various heat exchanger pipes for automobiles and to which the present invention is suitably applied. As shown in FIG. 1, the hollow body molding device 12 includes an injection molding mold 16 that forms a space into which molten resin 14 (see FIG. 2) is injected, and an injection device, not shown, that injects the molten resin 14 into the space formed in the injection molding mold 16. The molten resin 14 is injected from the injection device into the space formed in the injection molding mold 16, whereby the molten resin 14 is molded into a predetermined shape. Although examples of the molten resin 14 include a thermoplastic resin, a thermosetting resin, etc., a thermoplastic resin is used in the present embodiment. Examples of the thermoplastic resin include various resins including a polystyrene resin such as polystyrene, AS, or ABS, a polyolefin resin such as polypropylene or polyethylene, a polyamide resin such as nylon 66 or nylon 6, a polyester resin such as PET or PBT, POM, a polycarbonate, PPS, modified PPE, a PMMA resin, and a polyvinyl chloride resin. The thermoplastic resin may be a mixture of any of these resins with a reinforcement such as glass fiber, talc, calcium carbonate, or kaolin, an inorganic filler, etc. For example, the thermosetting resin can be any thermosetting resin that can be injection-molded and that is known as BMC, such as an unsaturated polyester resin or a phenolic resin.

Figure 2:
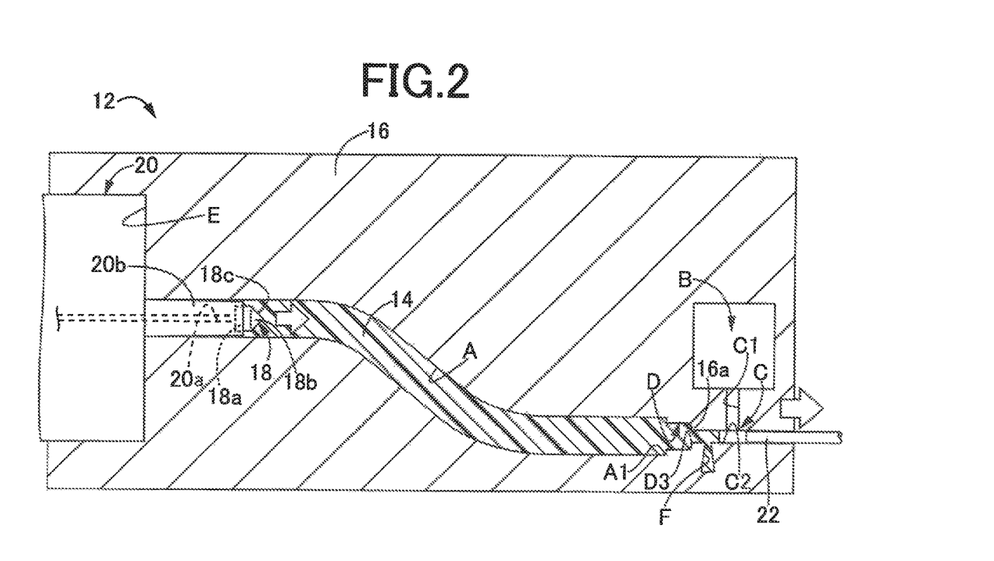
FIG. 2 is a view showing molten resin injected into a main cavity etc. formed in an injection molding mold of the hollow body molding device of FIG. 1.
Figure 3:
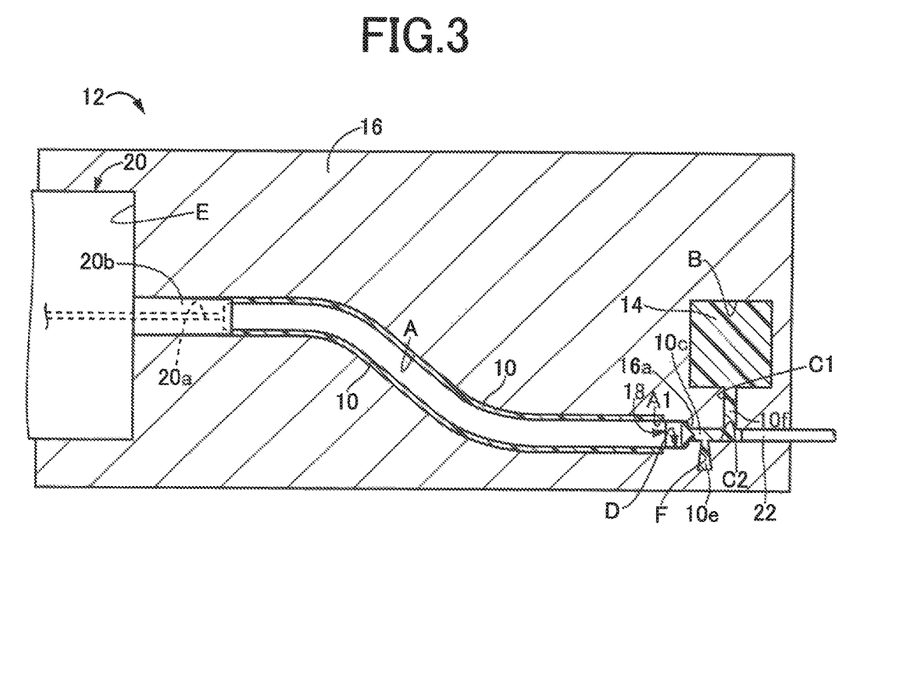
FIG. 3 is a view showing that a floating core placed in the main cavity of the hollow body molding device of FIG. 1 has been accommodated in a floating core accommodating portion formed in the injection molding mold after being moved through the molten resin injected into the main cavity by pressurized fluid.

As shown in FIGS. 1 to 3, the injection molding mold 16 includes: a main cavity A, namely a longitudinal space in a mold for forming the hollow molded body 10, the mold having in its one end a pressure port 20a including a floating core 18, and the main cavity A having an outlet A1 in its other end; a waste cavity B, namely a space which communicates with the main cavity A and to which a part of the molten resin 14 injected into the main cavity A is discharged; a communication passage C, namely a space that communicates with the waste cavity B; and a floating core accommodating portion D, namely a space that extends between the outlet A1 of the main cavity A and the communication passage C leading to the waste cavity B and adjoins the main cavity A. The injection molding mold 16 further has an accommodating space E that accommodates a part of a pressure-injection device 20 that pressure-injects pressurized fluid from one end of the main cavity A into the main cavity A through the pressure port 20a. The pressurized fluid is gas or liquid that does not react with, or is not compatible with, the molten resin 14 at the temperatures and pressures of the injection molding that is performed by the hollow body molding device 12. Although specific examples of the pressurized fluid include nitrogen gas, carbon dioxide gas, air, water, glycerin, and liquid paraffin, inert gases including nitrogen gas are preferred.

As shown in FIGS. 1 to 3, the communication passage C formed in the injection molding mold 16 is formed by a columnar first passage C1 communicating with the waste cavity B and a columnar second passage C2 communicating with the first passage C1 and the floating core accommodating portion D. A columnar opening and closing member 22 that permits and cuts off communication between the second passage C2 and the first passage C1 is fitted in the second passage C2. The columnar opening and closing member 22 is moved in the second passage C2 in the axial direction of the second passage C2 by a moving device, not shown. An injection gate F through which the molten resin 14 injected from the injection device is injected is connected to the second passage C2 of the communication passage C. After the opening and closing member 22 is moved by the moving device to cut off communication between the second passage C2 and the first passage C1, namely when the opening and closing member 22 is located at the position shown in FIG. 1, the molten resin 14 is injected through the injection gate F, whereby the floating core accommodating portion D and the main cavity A are filled with the molten resin 14 through the second passage C2, as shown in FIG. 2.

Figure 4:
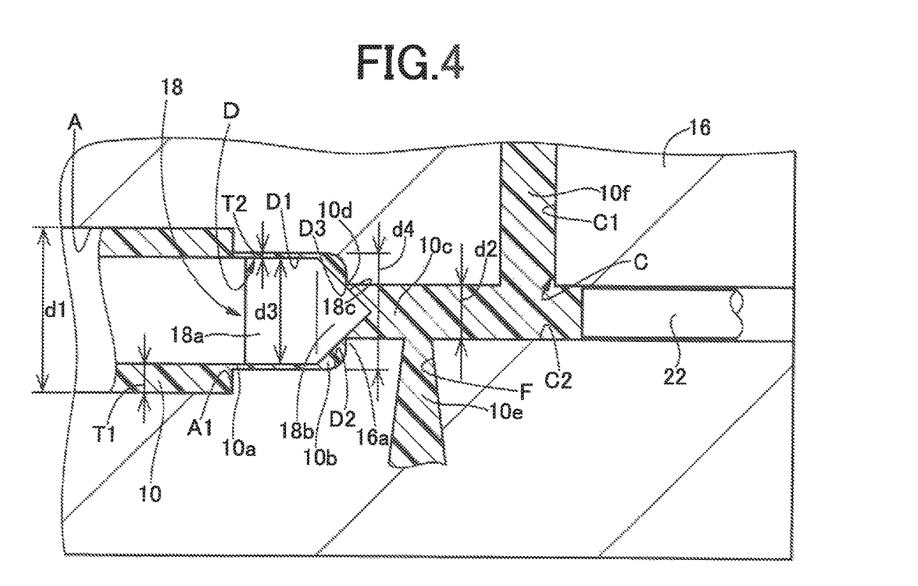
FIG. 4 is an enlarged view of a region around the floating core accommodating portion of FIG. 3.

As shown in FIG. 1, the main cavity A is a columnar space having a bent part in its intermediate portion. The diameter d1 of the circular section of the main cavity A is continuously the same in the longitudinal direction thereof, namely is the same as the diameter (outlet diameter) d1 of the outlet A1 of the main cavity A. As shown in FIG. 4, the floating core 18 is a single-piece member having the shape of a bullet and formed by a columnar portion 18a and a conical portion 18b. The columnar portion 18a has a columnar shape with an outside diameter d3 smaller than the diameter d1 of the circular section of the main cavity A and larger than the diameter d2 of the second passage C2 of the communication passage C. The conical portion 18b has a conical shape and is formed at the end of the columnar portion 18a on the communication passage C side. As shown in FIG. 1, the floating core 18 is placed in a nozzle portion 20b of the pressure-injection device 20 such that the axis of the columnar portion 18a of the floating core 18 is substantially aligned with the axis of the main cavity A. Although the floating core 18 may be made of any material such as resin, metal, or ceramic, it is preferable that the floating core 18 be made of the molten resin 14 as a process of separating the material of the floating core 18 and the molten resin 14 discharged into the waste cavity B is not required.

As shown in FIG. 4, the floating core accommodating portion D is formed by a columnar first space D1 and a second space D2 whose inside diameter decreases from the end of the columnar first space D1 on the communication passage C side as closer to the communication passage C. The inside diameter d4 of the first space D1 of the floating core accommodating portion D is smaller than the diameter d1 of the outlet A1 of the main cavity A and is larger than the outside diameter d3 of the columnar portion 18a of the floating core 18.

FIG. 4 is a view showing the floating core 18 discharged into the floating core accommodating portion D through the main cavity A by the pressurized fluid pressure-injected through the pressure port 20a into the main cavity A. Referring to FIG. 4, when the floating core 18 is discharged into the floating core accommodating portion D, a tapered surface 18c of the conical portion 18b of the floating core 18 contacts an annular core receiving portion 16a, namely a peripheral portion of an outlet port D3 of the floating core accommodating portion D which is located between the floating core accommodating portion D and the communication passage C, and the floating core 18 is received by the core receiving portion 16a. The diameter of the outlet port D3 of the floating core accommodating portion is the same as the diameter d2 of the second passage C2 of the communication passage C and is smaller than the outside diameter d3 of the columnar portion 18a of the floating core 18. When the floating core 18 is received by the core receiving portion 16a, the columnar portion 18a of the floating core 18 is completely accommodated in the floating core accommodating portion D, namely the end of the columnar portion 18a of the floating core 18 on the main cavity A side is accommodated in the floating core accommodating portion D. When the floating core 18 is received by the core receiving portion 16a, the tapered surface 18c of the conical portion 18b of the floating core 18 is pressed against the core receiving portion 16a, namely the peripheral portion of the outlet port D3 of the floating core accommodating portion D. The outlet port D3 of the floating core accommodating portion D is thus closed by the floating core 18. That is, communication between the floating core accommodating portion D and the second passage C2 of the communication passage C is cut off.

As shown in FIG. 4, when the floating core 18 is accommodated in the floating core accommodating portion D, that is, when the floating core 18 is received by the core receiving portion 16a, a thin-walled portion 10a, which is made of the molten resin 14 and has the shape of a thin-walled tube with a substantially uniform wall thickness T2 smaller than the wall thickness T1 of the hollow molded body 10 formed in the main cavity A, is formed on the inner wall surface of the floating core accommodating portion D due to clearance between the outer peripheral surface of the columnar portion 18a of the floating core 18 and the inner wall surface of the floating core accommodating portion D. The wall thickness T1 of the hollow molded body 10 is about (d1−d3)/2, and the wall thickness T2 of the thin-walled portion 10a is about (d4−d3)/2.

As shown in FIG. 4, when the molten resin 14 solidifies with the pressurized fluid being pressure-injected into the main cavity A, the hollow molded body 10 having a cylindrical shape is formed in the main cavity A, an intermediate diameter molded body 10b having a smaller diameter than the hollow molded body 10 and containing the floating core 18 is formed in the floating core accommodating portion D, and a small diameter molded body 10c having a smaller diameter than the intermediate diameter molded body 10b is formed in the second passage C2 of the communication passage C. The intermediate diameter molded body 10b is integrally connected to the hollow molded body 10 via the thin-walled portion 10a, and the small diameter molded body 10c is integrally connected to the intermediate diameter molded body 10b via a portion 10d formed by the conical portion 18b of the floating core 18 being received by the core receiving portion 16a and having a wall thickness of substantially zero. A first molded body 10e formed in the injection gate F and a second molded body 10f formed in the first passage C1 of the communication passage C are integrally connected to the small diameter molded body 10c. The intermediate diameter molded body 10b, the small diameter molded body 10c, the first molded body 10e, the second molded body 10f, etc. are each a portion that is not necessary for a product. The wall thickness T2 of the thin-walled portion 10a is a thickness experimentally predetermined so that the portion connected to the hollow molded body 10 and not necessary for a product can be easily separated via the thin-walled portion 10a from the hollow molded body 10 removed from the injection molding mold 16 of the hollow body molding device 12.

The hollow body molding device 12 configured as described above forms the hollow molded body 10 in the main cavity A by injecting the molten resin 14 into the main cavity A, then pressure-injecting the pressurized fluid through the pressure port 20a into the main cavity A to move the floating core 18 toward the outlet A1 through the molten resin 14 injected into the main cavity A, and thus extruding the molten resin 14 through the outlet A1 and discharging the extruded molten resin 14 into the waste cavity B. A method for producing the hollow molded body 10 by the hollow body molding device 12 will be described in detail below with reference to FIGS. 1 to 5.

First, as shown in FIG. 1, the opening and closing member 22 is moved so as to cut off communication between the second passage C2 and the first passage C1 in the communication passage C. Next, the molten resin 14 is injected through the injection gate F to fill the floating core accommodating portion D and the main cavity A with the molten resin 14.

Then, as shown in FIG. 2, the opening and closing member 22 is moved so that the second passage C2 and the first passage C1 communicate with each other in the communication passage C, namely so that the main cavity A communicates with the waste cavity B. Thereafter, the pressurized fluid is pressure-injected through the pressure port 20a into the main cavity A. For example, the floating core 18 is thus moved to the outlet A1 by this pressurized fluid while leaving the outer peripheral portion of the molten resin 14 filling the main cavity A, which is a portion starting to cool and solidify, and extruding the central portion of the molten resin 14 filling the main cavity A, which is a portion that cools later than the outer peripheral portion, through the outlet A1 of the main cavity A. The floating core 18 thus moved to the outlet A1 is accommodated in the floating core accommodating portion D. As shown in FIG. 3, the molten resin 14 thus extruded by the floating core 18 through the outlet A1 of the main cavity A is discharged into the waste cavity B through the communication passage C.

When the floating core 18 is accommodated in the floating core accommodating portion D, the tapered surface 18c of the conical portion 18b of the floating core 18 is pressed against the core receiving portion 16a by the pressurized fluid pressure-injected into the main cavity A and is received by the core receiving portion 16a. When the conical portion 18b of the floating core 18 is pressed against and received by the core receiving portion 16a, the floating core 18 cuts off communication between the floating core accommodating portion D and the communication passage C, and the molten resin 14 formed in the main cavity A is pressed against the inner wall surface of the main cavity A by the pressure of the pressure-injected pressurized fluid, so that the shape of the molten resin 14 formed in the main cavity A is maintained.

Subsequently, the molten resin 14 injected into the injection molding mold 16 is left to stand until the molten resin 14 solidifies. The hollow molded body 10 and the portion integrally connected to the hollow molded body 10 and not necessary for a product are then removed from the injection molding mold 16 by an operator or with a knock pin.

Figure 5:
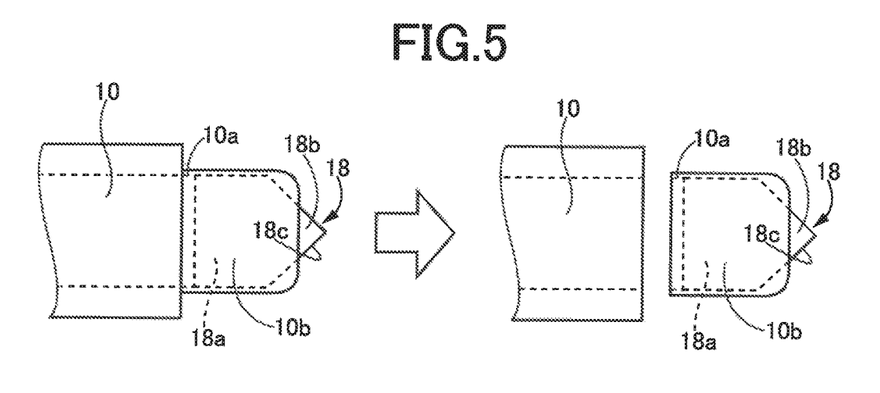
FIG. 5 is a view showing a hollow molded body and a portion connected to the hollow molded body and not necessary for a product, which have been removed from the injection molding mold of the hollow body molding device of FIG. 1, and showing that the unnecessary portion has been separated from the hollow molded body.

Thereafter, as shown in FIG. 5, the portion integrally connected to the hollow molded body 10 and not necessary for a product is separated from the hollow molded body 10 via the thin-walled portion 10a by hand etc. The hollow molded body 10 is thus produced by the hollow body molding device 12. The small diameter molded body 10c, the first molded body 10e, and the second molded body 10f, which are the portion connected to the intermediate diameter molded body 10b and not necessary for a product, are not shown in FIG. 5.

The operator subsequently separates the portion thus separated from the hollow molded body 10 and not necessary for a product between the intermediate diameter molded body 10b and the small diameter molded body 10c. The operator may visually check if the conical portion 18b of the floating core 18 is exposed from the separated intermediate diameter molded body 10b.

As described above, according to the hollow body molding device 12 of the present embodiment, when the floating core 18 extrudes the molten resin 14 and is accommodated in the floating core accommodating portion D, the molten resin 14 in the shape of a thin-walled tube with a wall thickness smaller than the wall thickness T1 of the hollow molded body 10, namely the thin-walled portion 10a, is formed on the inner wall surface of the floating core accommodating portion D by the floating core 18. The thin-walled portion 10a, which is a portion having the shape of a thin-walled tube and integrally connecting the hollow molded body 10 formed in the main cavity A to the unnecessary portion formed in the communication passage C etc., is thus formed in the floating core accommodating portion D through the molding process. The unnecessary portion connected to the hollow molded body 10 can therefore be more easily separated from the hollow molded body 10 via the thin-walled portion 10a by hand etc. as compared to conventional examples.

According to the hollow body molding device 12 of the present embodiment, the core receiving portion 16a having the outlet port D3 with a diameter smaller than the outside diameter d3 of the columnar portion 18a of the floating core 18 is located between the communication passage C and the floating core accommodating portion D in order to receive the floating core 18 moved to the outlet A1 of the main cavity A and discharged from the main cavity A by the pressurized fluid. When the floating core 18 is received by the core receiving portion 16a, the floating core 18 is completely contained in the floating core accommodating portion D, and communication between the floating core accommodating portion D and the second passage C2 of the communication passage C is cut off. Since the floating core 18 cuts off communication between the floating core accommodating portion D and the second passage C2 of the communication passage C when the floating core 18 is received by the core receiving portion 16a, backflow of the molten resin 14 from the communication passage C and the waste cavity B into the floating core accommodating portion D is prevented, and the wall thickness T2 and quality of the molten resin 14 formed in the shape of a thin-walled tube on the inner wall surface of the floating core accommodating portion D, namely the thin-walled portion 10a, are stabilized. Since the outlet port D3 of the core receiving portion 16a has a diameter smaller than the outside diameter d3 of the columnar portion 18a of the floating core 18, the portion with a wall thickness of substantially zero is formed so as to be continuous with the hollow molded body 10 and the intermediate diameter molded body 10b containing the floating core 18. For example, by separating, after the molding process, the molded body between the intermediate diameter molded body 10b formed in the floating core accommodating portion D and the small diameter molded body 10c formed in the second passage C2 of the communication passage C, it can be visually checked if the floating core 18 is exposed from the separated intermediate diameter molded body 10b, and it can thus be checked if the floating core 18 has passed through the main cavity A.

According to the hollow body molding device 12 of the present embodiment, the injection gate F is connected to the second passage C2 of the communication passage C, and the molten resin 14 injected through the injection gate F fills the main cavity A and the floating core accommodating portion D. Since the unnecessary portion formed in the communication passage C is separated from the hollow molded body 10 formed in the main cavity A after the molding process, no gate mark is left on the hollow molded body 10 by the injection gate F, and the hollow molded body 10 thus has improved appearance.

According to the hollow body molding device 12 of the present embodiment, the columnar portion 18a of the floating core 18 has a columnar shape, and the first space D1 of the floating core accommodating portion D has a circular section. Accordingly, the molten resin 14 that is in the shape of a thin-walled tube with a substantially uniform wall thickness and that integrally connects the hollow molded body 10 formed in the main cavity A and the unnecessary portion formed in the communication passage C etc., namely the thin-walled portion 10a, is formed in the floating core accommodating portion D through the molding process. This can suitably reduce the size of any resin burrs that are formed when the unnecessary portion connected to the hollow molded body 10 is separated from the hollow molded body 10 via the thin-walled portion 10a.

Other embodiments of the present invention will be described in detail below based on the drawings. In the following description, the portions common to the embodiments are denoted with the same reference characters and description thereof will be omitted.

Second Embodiment

Figure 6:
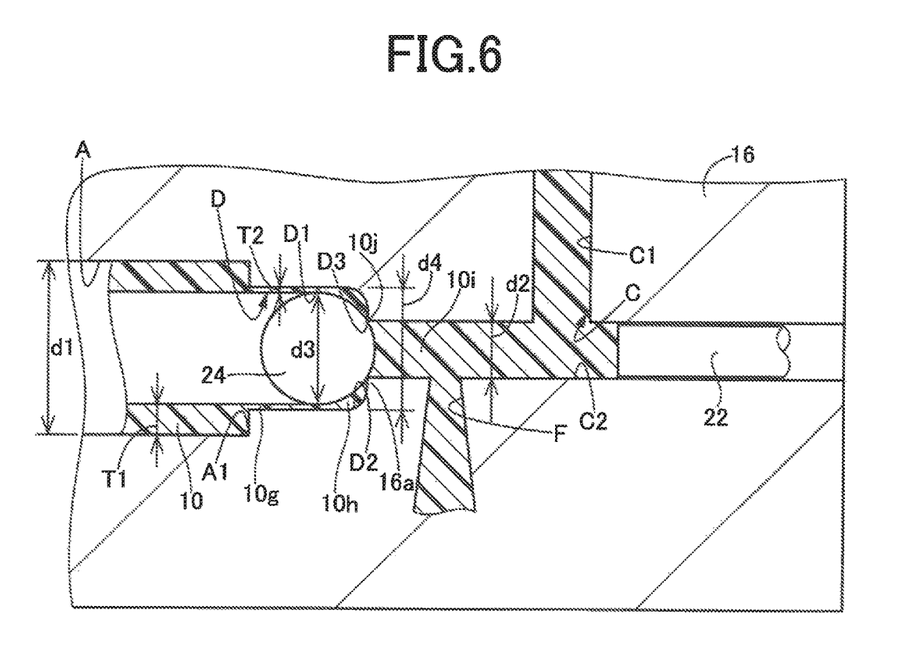
FIG. 6 is a view corresponding to FIG. 4, showing a hollow body molding device of another embodiment of the present invention.

As shown in FIG. 6, a hollow body molding device of the present embodiment is different from the above hollow body molding device 12 in that a floating core 24 has a spherical shape. The hollow body molding device of the present embodiment is otherwise substantially similar to the hollow body molding device 12. The outside diameter d3 of the spherical floating core 24 is the same as the outside diameter d3 of the columnar portion 18a of the floating core 18 described above.

FIG. 6 is a view showing the floating core 24 discharged into the floating core accommodating portion D through the main cavity A and received by the core receiving portion 16a due to pressurized fluid pressure-injected through the pressure port 20a into the main cavity A. Referring to FIG. 6, when the floating core 24 is received by the core receiving portion 16a, a thin-walled portion 10g, which is made of the molten resin 14 and has the shape of a thin-walled tube with a substantially uniform wall thickness T2 smaller than the wall thickness T1 of the hollow molded body 10 formed in the main cavity A, is formed on the inner wall surface of the floating core accommodating portion D by the floating core 24.

As shown in FIG. 6, when the molten resin 14 solidifies with the pressurized fluid being pressure-injected into the main cavity A, the hollow molded body 10 having a cylindrical shape is formed in the main cavity A, an intermediate diameter molded body 10h having a smaller diameter than the hollow molded body 10 and containing the floating core 24 is formed in the floating core accommodating portion D, and a small diameter molded body 10i having a smaller diameter than the intermediate diameter molded body 10h is formed in the second passage C2 of the communication passage C. The intermediate diameter molded body 10h is integrally connected to the hollow molded body 10 via the thin-walled portion 10g, and the small diameter molded body 10i is integrally connected to the intermediate diameter molded body 10h via a portion 10j formed by the floating core 24 being received by the core receiving portion 16a and having a wall thickness of substantially zero.

Figure 7:
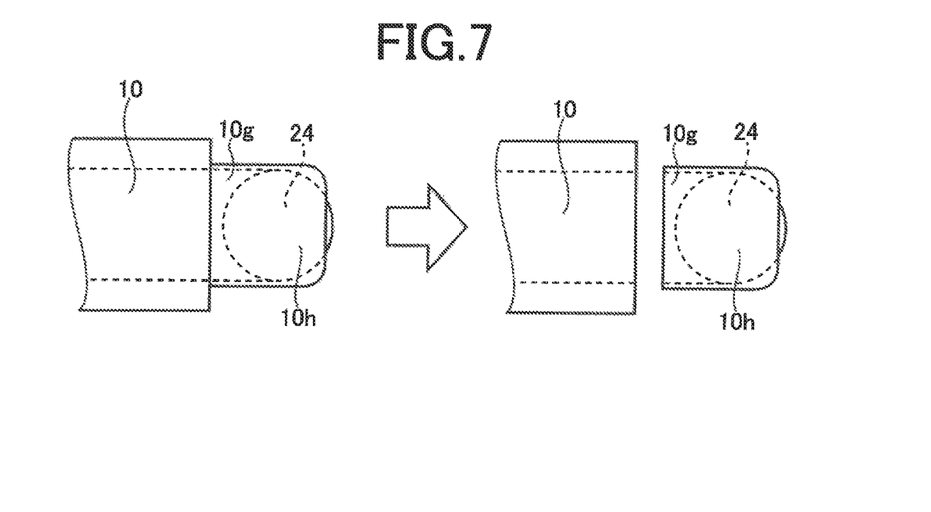
FIG. 7 is a view showing a hollow molded body and a portion connected to the hollow molded body and not necessary for a product, which have been removed from the injection molding mold of the hollow body molding device of FIG. 6, and showing that the unnecessary portion has been separated from the hollow molded body.

According to the hollow body molding device configured as described above, the molten resin 14 injected into the injection molding mold 16 solidifies, and the hollow molded body 10 and a portion integrally connected to the hollow molded body 10 and not necessary for a product are removed from the injection molding mold 16 by an operator or with a knock pin. As shown in FIG. 7, the portion integrally connected to the hollow molded body 10 and not necessary for a product is then separated from the hollow molded body 10 via the thin-walled portion 10g by hand etc. The small diameter molded body 10i etc., which are each the portion connected to the intermediate diameter molded body 10h and not necessary for a product, are not shown in FIG. 7. The operator may subsequently separate the portion thus separated from the hollow molded body 10 and not necessary for a product between the intermediate diameter molded body 10h and the small diameter molded body 10i, and may visually check if the floating core 24 is exposed from the separated intermediate diameter molded body 10h.

As described above, according to the hollow body molding device of the present embodiment, the floating core 24 has a spherical shape and the first space D1 of the floating core accommodating portion D has a circular section. Accordingly, the molten resin 14 that is in the shape of a thin-walled tube with a uniform wall thickness and that integrally connects the hollow molded body 10 formed in the main cavity A and the unnecessary portion formed in the communication passage C etc., namely the thin-walled portion 10g, is formed in the floating core accommodating portion D through the molding process. This can suitably reduce the size of any resin burrs that are formed when the unnecessary portion connected to the hollow molded body 10 is separated from the hollow molded body 10 via the thin-walled portion 10g.

Third Embodiment

Figure 8:
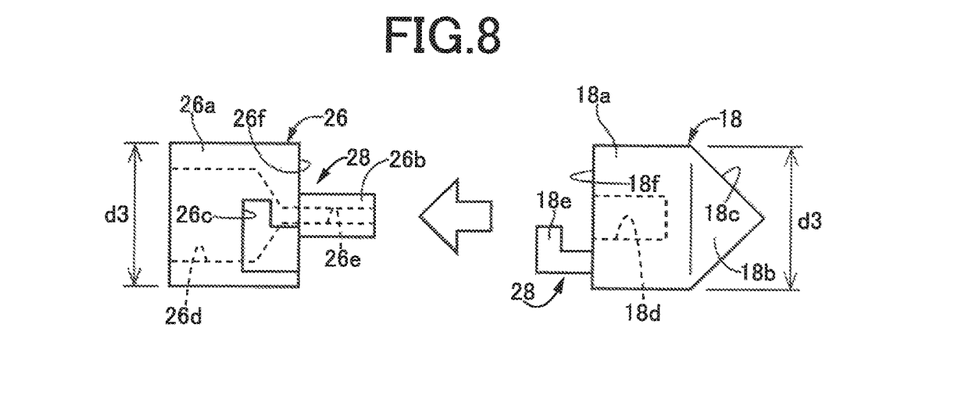
FIG. 8 is a view of a hollow body molding device of still another embodiment of the present invention, showing a floating core and a product core which are included in the hollow body molding device.
Figure 9:
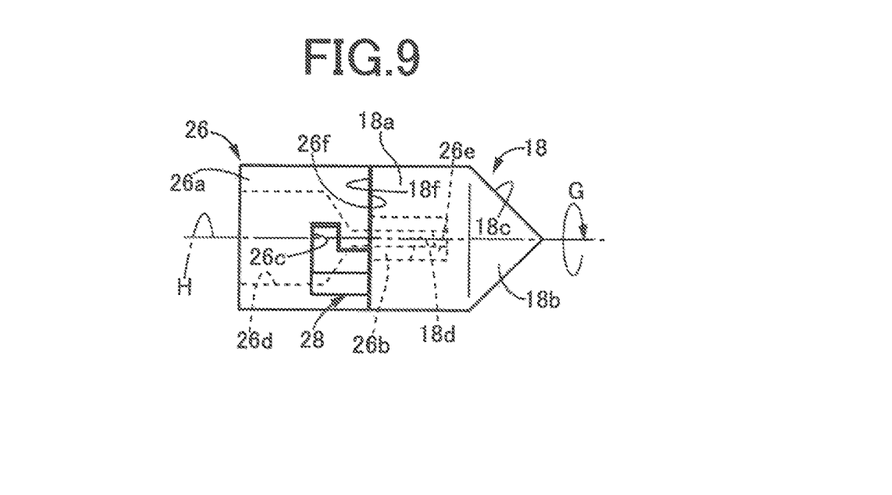
FIG. 9 is a view showing the floating core and the product core shown in FIG. 8 are latched and held by each other.
Figure 10:
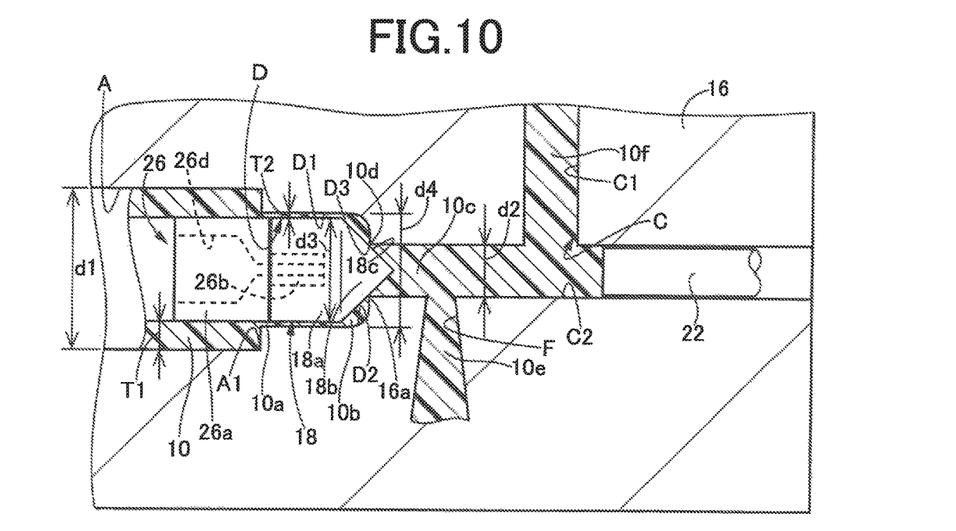
FIG. 10 is a view showing that the floating core has been accommodated in a floating core accommodating portion formed in the injection molding mold after the floating core and the product core placed in the main cavity of the hollow body molding device of FIG. 8 are moved through the molten resin injected into the main cavity by pressurized fluid.

As shown in FIGS. 8 to 10, a hollow body molding device of the present embodiment is different from the hollow body molding device 12 in that a product core 26 adjoins the pressure port 20a side (left side in FIGS. 8 and 9) of the floating core 18 and in that the product core 26 and the floating core 18 have a latch-and-hold mechanism 28 that latches and holds the floating core 18 and the product core 26. The hollow body molding device of the present embodiment is otherwise substantially similar to the hollow body molding device 12.

As shown in FIG. 8, the product core 26 is a single-piece member formed by a substantially columnar body 26a whose outside diameter d3 is the same as the outside diameter d3 of the columnar portion 18a of the floating core 18, a substantially columnar shaft portion 26b projecting from the central part of the body 26a toward the floating core 18, and a catch-and-hold groove 26c formed in the outer peripheral surface of the body 26a. The product core 26 has holes 26d, 26e formed through the central part of the body 26a and the central part of the shaft portion 26b, respectively.

As shown in FIG. 8, the latch-and-hold mechanism 28 includes the shaft portion 26b and the catch-and-hold groove 26c of the product core 26, a fitting hole 18d formed in a columnar shape in the columnar portion 18a of the floating core 18 so that the shaft portion 26b of the product core 26 is fitted therein, and a latch portion 18e projecting from the outer peripheral portion of the columnar portion 18a of the floating core 18 toward the product core 26 so that the latch portion 18e can be caught and held by the catch-and-hold groove 26c of the product core 26.

A method for latching and holding the floating core 18 and the product core 26 with the latch-and-hold mechanism 28 will be described. First, as shown in FIG. 8, the floating core 18 is moved toward the product core 26, and the shaft portion 26b of the product core 26 is fitted into the fitting hole 18d of the floating core 18. Next, the floating core 18 is positioned about the shaft portion 26b with respect to the product core 26 so that the latch portion 18e of the floating core 18 can be inserted into the catch-and-hold groove 26c of the product core 26. Then, the shaft portion 26b of the product core 26 is further fitted into the fitting hole 18d of the floating core 18 until a side surface 18f on the product core 26 side of the columnar portion 18a of the floating core 18 contacts a side surface 26f on the floating core 18 side of the body 26a of the product core 26. Subsequently, as shown in FIG. 9, the floating core 18 is turned about the axis H of the shaft portion 26b of the product core 26 in the direction shown by arrow G with respect to the product core 26. The latch portion 18e of the floating core 18 can thus be caught and held by the catch-and-hold groove 26c of the product core 26. That is, the floating core 18 and the product core 26 are latched and held by the latch-and-hold mechanism 28. When the latch portion 18e of the floating core 18 is caught and held by the catch-and-hold groove 26c of the product core 26 via the latch-and-hold mechanism 28, the floating core 18 is inhibited from moving away from the product core 26 in the direction of the axis H of the shaft portion 26b of the product core 26, and the floating core 18 and the product core 26 are fixedly connected to each other.

FIG. 10 is a view showing the floating core 18 discharged into the floating core accommodating portion D and received by the core receiving portion 16a after the floating core 18 and the product core 26 connected to the floating core 18 pass through the main cavity A due to pressurized fluid pressure-injected through the pressure port 20a into the main cavity A. Referring to FIG. 10, when the floating core 18 is received by the core receiving portion 16a, that is, when the floating core 18 is accommodated in the floating core accommodating portion D, the product core 26 connected to the floating core 18 remains in the other end of the main cavity A, namely the end of the main cavity A on the outlet A1 side, due to the floating core 18. When the floating core 18 is received by the core receiving portion 16a, the end of the body 26a of the product core 26 on the floating core 18 side is located in the floating core accommodating portion D.

As shown in FIG. 10, when the floating core 18 is received by the core receiving portion 16a, an annular thin-walled portion 10a, which is made of the molten resin 14 and has a uniform wall thickness T2 smaller than the wall thickness T1 of the hollow molded body 10 formed in the main cavity A, is formed on the inner wall surface of the floating core accommodating portion D by the floating core 18 and a part of the product core 26.

As shown in FIG. 10, when the molten resin 14 solidifies with the pressurized fluid being pressure-injected into the main cavity A, the hollow molded body 10 having a cylindrical shape is formed in the main cavity A, an intermediate diameter molded body 10b having a smaller diameter than the hollow molded body 10 and containing the floating core 18 is formed in the floating core accommodating portion D, and a small diameter molded body 10c having a smaller diameter than the intermediate diameter molded body 10b is formed in the second passage C2 of the communication passage C. The cylindrical hollow molded body 10 contains the product core 26 in its end on the floating core accommodating portion D side. The intermediate diameter molded body 10b is integrally connected via the thin-walled portion 10a to the hollow molded body 10 containing the product core 26. The small diameter molded body 10c is integrally connected to the intermediate diameter molded body 10b via a portion 10d formed by the floating core 18 being received by the core receiving portion 16a and having a wall thickness of substantially zero.

Figure 11:
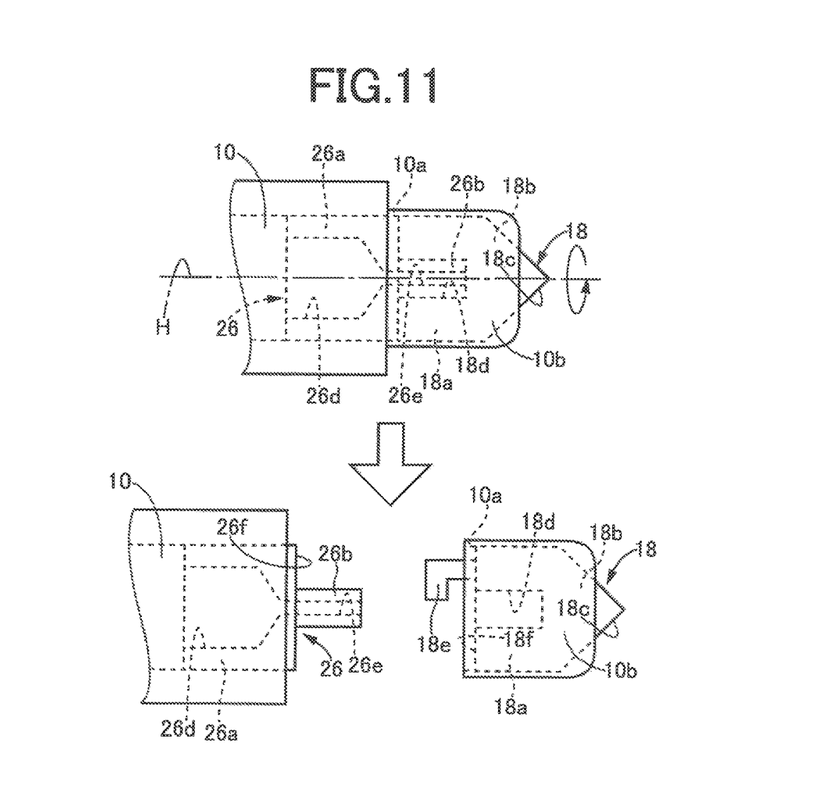
FIG. 11 is a view showing a hollow molded body and a portion connected to the hollow molded body and not necessary for a product, which have been removed from the injection molding mold of the hollow body molding device of FIG. 8, and showing that the unnecessary portion has been separated from the hollow molded body.

According to the hollow body molding device configured as described above, the molten resin 14 injected into the injection molding mold 16 solidifies, and the hollow molded body 10 containing the product core 26 and a portion integrally connected to the hollow molded body 10 and not necessary for a product are removed from the injection molding mold 16 by an operator or with a knock pin. As shown in FIG. 11, the intermediate diameter molded body 10b connected to the hollow molded body 10 is then turned about the axis H of the shaft portion 26b of the product core 26 in the opposite direction to the direction shown by arrow G with respect to the hollow molded body 10. The portion integrally connected to the hollow molded body 10 and not necessary for a product is thus separated from the hollow molded body 10 via the thin-walled portion 10a by hand etc., and the latch portion 18e of the floating core 18 is released from the catch-and-hold groove 26c of the product core 26. The small diameter molded body 10c, the first molded body 10e, and the second molded body 10f, which are the portion connected to the intermediate diameter molded body 10b and not necessary for a product, are not shown in FIG. 11.

The operator may separate the portion thus separated from the hollow molded body 10 and not necessary for a product between the intermediate diameter molded body 10b and the small diameter molded body 10c, and may visually check if the conical portion 18b of the floating core 18 is exposed from the separated intermediate diameter molded body 10b.

As described above, according to the hollow body molding device of the present embodiment, the product core 26 is connected to the floating core 18 so as to adjoin the pressure port 20a side of the floating core. The product core 26 thus remains in the other end of the main cavity A when the floating core 18 is accommodated in the floating core accommodating portion D. Since the product core 26 is contained in the end of the hollow molded body 10 formed in the main cavity A, a new shape can be added to one end of the hollow molded body 10 by the product core 26.

Fourth Embodiment

Figure 12:
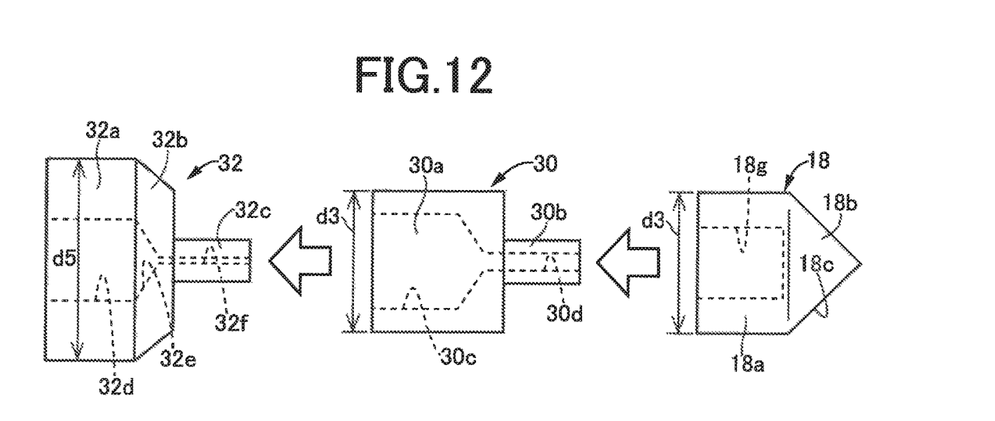
FIG. 12 is a view of a hollow body molding device of still another embodiment of the present invention, showing a floating core, a product core, and an increased diameter core which are included in the hollow body molding device.
Figure 13:
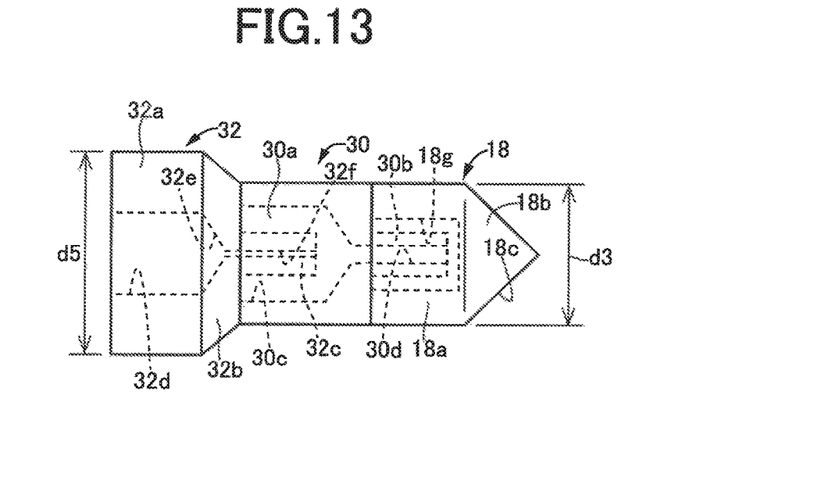
FIG. 13 is a view showing the floating core, the product core, and the increased diameter core of FIG. 12 which have been combined together.
Figure 14:
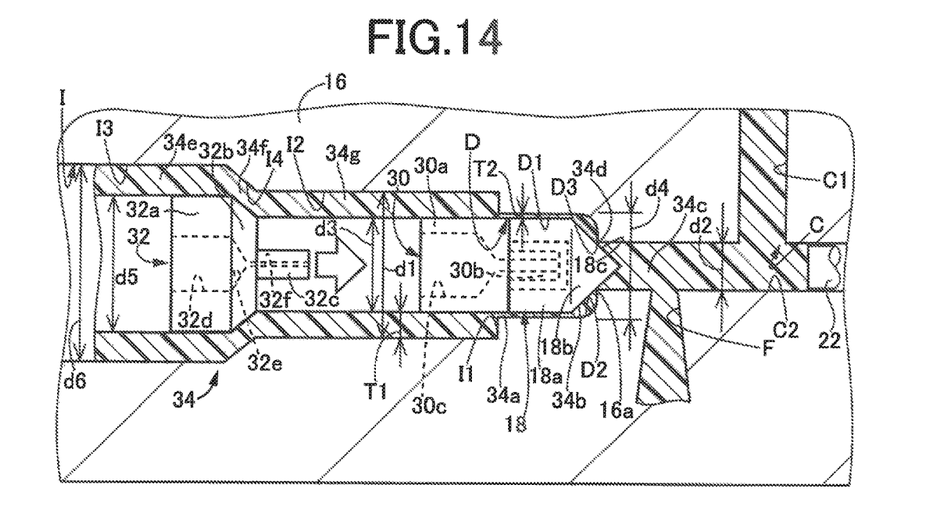
FIG. 14 is a view showing that the floating core has been accommodated in a floating core accommodating portion formed in the injection molding mold after the floating core, the product core, and the increased diameter core placed in the main cavity of the hollow body molding device of FIG. 12 are moved through the molten resin injected into the main cavity by pressurized fluid.

As shown in FIGS. 12 to 14, a hollow body molding device of the present embodiment is different from the hollow body molding device 12 in that a product core 30 adjoins the pressure port 20a side (left side in FIGS. 12 and 13) of the floating core 18 and an increased diameter core 32 adjoins the pressure port 20a side of the product core 30 and in that the injection molding mold 16 has a main cavity I having a different shape from the main cavity A. The hollow body molding device of the present embodiment is otherwise substantially similar to the hollow body molding device 12.

As shown in FIG. 12, the product core 30 is a single-piece member formed by a substantially columnar body 30a whose outside diameter d3 is the same as the outside diameter d3 of the columnar portion 18a of the floating core 18 and a substantially columnar shaft portion 30b projecting from the central part of the body 30a toward the floating core 18. The product core 30 has holes 30c, 30d formed through the central part of the body 30a and the central part of the shaft portion 30b, respectively.

As shown in FIG. 12, the increased diameter core 32 is a single-piece member formed by a substantially columnar body 32a whose outside diameter d5 is larger than the outside diameter d3 of the columnar portion 18a of the floating core 18, a tapered portion 32b formed in a tapered shape so as to project from the body 32a toward the product core 30, and a substantially columnar shaft portion 32c projecting from the central part of the tapered portion 32b toward the product core 30. The increased diameter core 32 has holes 32d, 32e, 32f formed through the central part of the body 32a, the central part of the tapered portion 32b, and the central part of the shaft portion 32c, respectively, so as to allow pressurized fluid pressure-injected through the pressure port 20a into the main cavity I to flow into the product core 30. The outside diameter of the end of the tapered portion 32b on the shaft portion 32c side is the same as the outside diameter d3 of the columnar portion 18a of the floating core 18.

As shown in FIG. 12, the floating core 18 has a columnar hole 18g in its columnar portion 18a. The inside diameter of the hole 18g in the columnar portion 18a of the floating core 18 is larger than the outside diameter of the shaft portion 30b of the product core 30, and the depth distance of the hole 18g is longer than the length distance in the longitudinal direction of the shaft portion 30b of the product core 30. The inside diameter of the hole 30c in the body 30a of the product core 30 is larger than the outside diameter of the shaft portion 32c of the increased diameter core 32, and the depth distance of the hole 30c is longer than the length distance in the longitudinal direction of the shaft portion 32c of the increased diameter core 32. As shown in FIG. 13, the floating core 18, the product core 30, and the increased diameter core 32 are thus combined together, and the floating core 18, the product core 30, and the increased diameter core 32 are disposed at the end of the main cavity I on the pressure port 20a side. The increased diameter core 32 is disposed on the pressure port 20a side of the floating core 18, and the product core 30 is disposed between the floating core 18 and the increased diameter core 32.

As shown in FIG. 14, the main cavity I includes a small diameter portion I2 formed on the outlet I1 side of the main cavity I, an increased diameter portion I3 formed on the pressure port 20a side of the small diameter portion I2 and having an inside diameter larger than the inside diameter d1 of the small diameter portion I2, and a tapered portion I4 formed in a tapered shape between the increased diameter portion I3 and the small diameter portion I2. The inside diameter d1 of the small diameter portion I2 and the diameter of the outlet I1 are the same as the outlet diameter d1 of the main cavity A of the first embodiment, and the inside diameter d6 of the increased diameter portion I3 is larger than the inside diameter d1 of the small diameter portion I2.

FIG. 14 is a view showing the floating core 18 discharged into the floating core accommodating portion D and received by the core receiving portion 16a after the floating core 18, the product core 30, and the increased diameter core 32 pass through the main cavity I due to the pressurized fluid pressure-injected through the pressure port 20a into the main cavity I. As shown in FIG. 14, the increased diameter core 32 remains in the end on the outlet I1 side of the increased diameter portion I3 of the main cavity I since the outer part of the molten resin 14 injected into the small diameter portion I2 of the main cavity I hardens or becomes viscous and the increased diameter core 32 is subjected to relatively large resistance by this hard or viscous part of the molten resin 14. The pressurized fluid pressure-injected through the pressure port 20a flows through the holes 32d, 32e, 32f in the increased diameter core 32. The floating core 18 and the product core 30 are thus moved to the outlet I1 by the pressurized fluid, and the floating core 18 is received by the core receiving portion 16a. When the floating core 18 is received by the core receiving portion 16a, the product core 30 remains in the end on the outlet I1 side of the small diameter portion I2 of the main cavity I due to the floating core 18, and the end on the floating core 18 side of the body 30a of the product core 30 is located in the floating core accommodating portion D.

As shown in FIG. 14, when the floating core 18 is received by the core receiving portion 16a, an annular thin-walled portion 34a, which is made of the molten resin 14 and has a uniform wall thickness T2 smaller than the wall thickness T1 of a small diameter portion 34g, described below, of a hollow molded body 34 formed in the main cavity I, is formed on the inner wall surface of the floating core accommodating portion D by the floating core 18 and a part of the product core 30.

As shown in FIG. 14, when the molten resin 14 solidifies with the pressurized fluid being pressure-injected into the main cavity I, the hollow molded body 34 having a cylindrical shape is formed in the main cavity I, an intermediate diameter molded body 34b having a smaller diameter than the hollow molded body 34 and containing the floating core 18 is formed in the floating core accommodating portion D, and a small diameter molded body 34c having a smaller diameter than the intermediate diameter molded body 34b is formed in the second passage C2 of the communication passage C. The cylindrical hollow molded body 34 contains the product core 30 in its end on the floating core accommodating portion D side. The intermediate diameter molded body 34b is integrally connected via the thin-walled portion 34a to the hollow molded body 34 containing the product core 30. The small diameter molded body 34c is integrally connected to the intermediate diameter molded body 34b via a portion 34d formed by the floating core 18 being received by the core receiving portion 16a and having a wall thickness of substantially zero. The hollow molded body 34 is a single-piece molded body formed by an increased diameter portion 34e formed by the increased diameter portion I3 of the main cavity I, a tapered portion 34f formed by the tapered portion 14 of the main cavity I, and the small diameter portion 34g formed by the small diameter portion I2 of the main cavity I. In the hollow molded body 34, the inside diameter d5 of the increased diameter portion 34e is larger than the inside diameter d3 of the small diameter portion 34g. The inside diameter d5 of the increased diameter portion 34e is the same as the outside diameter d5 of the body 32a of the increased diameter core 32, and the inside diameter d3 of the small diameter portion 34g is the same as the outside diameter d3 of the cylindrical portion 18a of the floating core 18.

Figure 15:
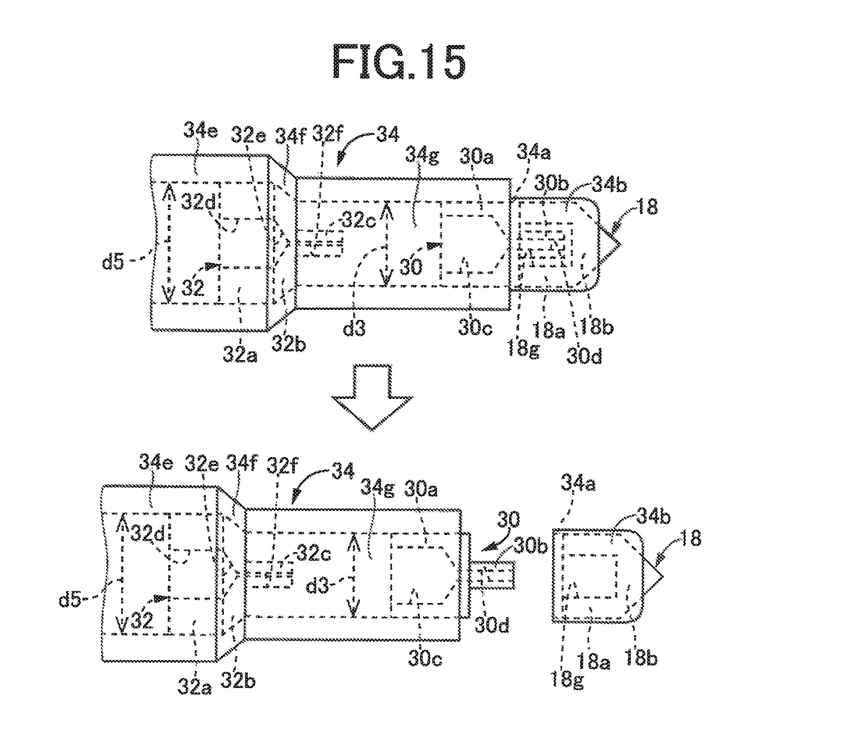
FIG. 15 is a view showing a hollow molded body and a portion connected to the hollow molded body and not necessary for a product, which have been removed from the injection molding mold of the hollow body molding device of FIG. 12, and showing that the unnecessary portion has been separated from the hollow molded body.

According to the hollow body molding device configured as described above, the molten resin 14 injected into the injection molding mold 16 solidifies, and the hollow molded body 34 containing the product core 30 and a portion integrally connected to the hollow molded body 34 and not necessary for a product are removed from the injection molding mold 16 by an operator or with a knock pin. As shown in FIG. 15, the portion integrally connected to the hollow molded body 34 and not necessary for a product is thus separated from the hollow molded body 34 via the thin-walled portion 34a by hand etc. The small diameter molded body 34c etc., which are each the portion connected to the intermediate diameter molded body 34b and not necessary for a product, are not shown in FIG. 15. The operator may subsequently separate the portion thus separated from the hollow molded body 34 and not necessary for a product between the intermediate diameter molded body 34b and the small diameter molded body 34c, and may visually check if the floating core 18 is exposed from the separated intermediate diameter molded body 34b.

As described above, according to the hollow body molding device of the present embodiment, the main cavity I includes the small diameter portion I2 formed on the outlet I1 side of the main cavity I, and the increased diameter portion I3 formed on the pressure port 20a side of the small diameter portion I2 and having an inside diameter larger than the inside diameter d1 of the small diameter portion I2. The increased diameter core 32 having an outside diameter larger than the outside diameter d3 of the columnar portion 18a of the floating core 18 is disposed on the pressure port 20a side of the floating core 18, and the increased diameter core 32 has the holes 32d, 32e, 32f that allow the pressurized fluid pressure-injected through the pressure port 20a into the main cavity I to flow into the floating core 18. When the floating core 18 and the increased diameter core 32 are moved toward the outlet I1 by the pressurized fluid, the increased diameter core 32 remains in the end on the outlet I1 side of the increased diameter portion I3 of the main cavity I. Accordingly, the pressurized fluid flows through the holes 32d, 32e, 32f in the increased diameter core 32, and the floating core 18 is accommodated in the floating core accommodating portion D by the pressurized fluid. Such a hollow molded body 34 can thus be formed that the inside diameter d3 of the small diameter portion 34g of the hollow molded body 34 formed in the main cavity I is smaller than the inside diameter d5 of the increased diameter portion 34e.

According to the hollow body molding device of the present embodiment, the product core 30 is disposed between the floating core 18 and the increased diameter core 32. The product core 30 remains in the end on the outlet I1 side of the small diameter portion I2 of the main cavity I when the floating core 18 is accommodated in the floating core accommodating portion D. Such a hollow molded body 34 can thus be formed that the inside diameter d3 of the small diameter portion 34g of the hollow molded body 34 formed in the main cavity I is smaller than the inside diameter d5 of the increased diameter portion 34e. Moreover, a new shape can be added to one end of the hollow molded body 34 by the product core 30.

Although the embodiments of the present invention are described above in detail based on the drawings, the present invention is applicable in other forms.

In the embodiments, the floating cores 18, 24 have the shape of a bullet or a sphere. However, the floating cores 18, 24 may have other shapes. The first space D1 of the floating core accommodating portion D may have a section other than a circular section. That is, the floating cores 18, 24 may have any shape and the floating core accommodating portion D may have any sectional shape as long as the molten resin 14 in the shape of a thin-walled tube is formed on the inner wall surface of the floating core accommodating portion D when the floating core 18, 24 is accommodated in the floating core accommodating portion D.

In the embodiment, the product core 26 and the floating core 18 have the latch-and-hold mechanism 28 that latches and holds the product core 26 and the floating core 18. However, the product core 30 and the floating core 18 may have a latch-and-hold mechanism like the latch-and-hold mechanism 28.

In the embodiments, after the hollow molded body 10, 34 and the portion integrally connected to the hollow molded body 10, 34 and not necessary for a product are removed from the injection molding mold 16, the hollow molded body 10, 34 is first separated from the portion not necessary for a product via the thin-walled portion 10a, 10g, 34a, and the portion not necessary for a product is then separated between the intermediate diameter molded body 10b, 10h, 34b and the small diameter molded body 10c, 10i, 34c. However, after the hollow molded body 10, 34 and the portion integrally connected to the hollow molded body 10, 34 and not necessary for a product are removed from the injection molding mold 16, the portion not necessary for a product may first be separated between the intermediate diameter molded body 10b, 10h, 34b and the small diameter molded body 10c, 10i, 34c, and the intermediate diameter molded body 10b, 10h, 34b may then be separated from the hollow molded body 10, 34 via the thin-walled portion 10a, 10g, 34a. That is, it may be checked if the floating core 18, 24 is exposed from the intermediate diameter molded body 10b, 10h, 34b, before the portion not necessary for a product (the intermediate diameter molded body 10b, 10h, 34b) is separated from the hollow molded body 10, 34 via the thin-walled portion 10a, 10g, 34a.

The above embodiments are by way of example only and the present invention can be carried out in various modified or improved forms based on the knowledge of a person skilled in the art.

REFERENCE SIGNS LIST 10, 34: Hollow molded body
12: Hollow body molding device
14: Molten resin
16a: Core receiving portion
18, 24: Floating core
20a: Pressure port
26, 30: Product core
32: Increased diameter core
32d, 32e, 32f: Hole
A, I: Main cavity
A1, I1: Outlet
B: Waste cavity
C: Communication passage
D: Floating core accommodating portion
F: Injection gate
d1: Diameter (Outlet diameter)
d3: Outside diameter
d4: Inside diameter
I2: Small diameter portion
I3: Increased diameter portion

The invention claimed is:
1. A hollow body molding device that forms a hollow molded body in a main cavity of a mold having in its one end a pressure port including a floating core by injecting molten resin through an injection gate into the main cavity having an outlet in its other end, and then pressure-injecting pressurized fluid through the pressure port into the main cavity to move the floating core toward the outlet through the molten resin injected into the main cavity so as to extrude the molten resin through the outlet and discharge the extruded molten resin into a waste cavity, the hollow body molding device comprising:
a floating core accommodating portion that is located between the outlet of the main cavity and a communication passage leading to the waste cavity and adjoins the main cavity and that accommodates the floating core moved to the outlet by the pressurized fluid,
an inside diameter of the floating core accommodating portion being smaller than an outlet diameter of the main cavity and being larger than an outside diameter of the floating core,
wherein a product core is connected to the floating core so as to adjoin the pressure port side of the floating core, and when the floating core is accommodated in the floating core accommodating portion, the product core remains in the other end of the main cavity.

2. The hollow body molding device according to claim 1, further comprising:
a core receiving portion that has a diameter smaller than the outside diameter of the floating core and that is located between the communication passage and the floating core accommodating portion to receive the floating core moved to the outlet and discharged from the main cavity by the pressurized fluid, wherein
when the floating core is received by the core receiving portion, the floating core is completely contained in the floating core accommodating portion and communication between the floating core accommodating portion and the communication passage is cut off.

3. The hollow body molding device according to claim 1, wherein
the injection gate is connected to the communication passage, and
the molten resin injected through the injection gate fills the main cavity and the floating core accommodating portion.

4. The hollow body molding device according to claim 1, wherein
the floating core has a columnar or spherical shape, and
the floating core accommodating portion has a circular section.

5. The hollow body molding device according to claim 1, wherein
the main cavity includes a small diameter portion formed on the outlet side of the main cavity and an increased diameter portion formed on the pressure port side of the small diameter portion and having an inside diameter larger than an inside diameter of the small diameter portion,
an increased diameter core having an outside diameter larger than the outside diameter of the floating core is disposed on the pressure port side of the floating core,
the increased diameter core has a hole that allows the pressurized fluid pressure-injected through the pressure port into the main cavity to flow into the floating core, and
when the floating core and the increased diameter core are moved toward the outlet by the pressurized fluid, the increased diameter core remains in the increased diameter portion of the main cavity.

6. The hollow body molding device according to claim 5, wherein a product core is disposed between the floating core and the increased diameter core, and when the floating core is accommodated in the floating core accommodating portion, the product core remains in the other end of the main cavity.

* * * * *